United States Patent [19]
Caronni et al.

[11] Patent Number: 6,049,878
[45] Date of Patent: Apr. 11, 2000

[54] EFFICIENT, SECURE MULTICASTING WITH GLOBAL KNOWLEDGE

[75] Inventors: Germano Caronni, Sunnyvale, Calif.; Marcel Waldvogel, Winterthur, Switzerland

[73] Assignee: Sun Microsystems, Inc., Palo Alto, Calif.

[21] Appl. No.: 09/009,475

[22] Filed: Jan. 20, 1998

[51] Int. Cl.[7] .................................................. G09C 1/06
[52] U.S. Cl. ......................... 713/201; 713/163; 380/277; 380/279
[58] Field of Search .................................. 380/277, 279, 380/281, 283; 713/163, 201

[56] References Cited

U.S. PATENT DOCUMENTS 5,748,736  5/1998  Mittra ........................................ 380/21

OTHER PUBLICATIONS

Schneier, Applied Cryptography, 1995, pp. 3, 78, 173, 506, 514.

Ingemar Ingemarsson, Donald T. Tang, and C. K. Wong, "A Conference Key Distribution System," IEEE Transactions on Information Theory, Sep. 1982.

Guang–Huei Chiou, Wen–Tsuen Chen, "Secure Broadcasting Using the Secure Lock," IEEE Transactions on Information Software Engineering, Aug. 1989.

Mike Burmester, Yvo G. Desmedt, "Efficient and Secure Conference–Key Distribution," Security Protocols Workshop 1996.

Li Gong, Nacham Shacham, "Multicast Security and its Extension to a Mobile Environment," ACM–Baltzer Journal of Wireless Networks, Oct. 1995.

Suvo Mittra, "Iolus: A Framework for Scalable Secure Multicasting," Proceedings of the ACM SIGCOMM '97, Sep. 14–18, 1997.

T. Ballardie, J. Crowcroft, "Multicast–Specific Security Threats and Counter–Measures," Symposium on Network and Distributed System Security, 1995.

Ashar Aziz, Martin Patterson, "Design and Implementation of SKIP," White Paper ICG–95–0004, Jun. 28, 1995.

A. Ballardie, "Scalable Multicast Key Distribution," rfc1949.txt at info.internet.isi.edu, May 1996.

H. Harney, C. Muckenhirn, "Group Key Management Protocol (GKMP) Specification," rfc2093.txt at info.internet.isi.edu, Jul. 1997.

H. Harney, C. Muckenhirn, "Group Key Management Protocol (GKMP) Architecture," rfc2094.txt at info.internet.isi.edu, Jul. 1997.

*Primary Examiner*—Thomas R. Peeso
*Attorney, Agent, or Firm*—Holland & Hart

[57] ABSTRACT

A system for secure multicast including at least one sending entity operating on a sending computer system, the sending entity with a sending multicast application running on the sending computer system. A number of receiving entities each running on a receiving computer system, the receiving entities having a receiving multicast application running. A traffic distribution component coupled to the sending entity and each of the receiving entities, where the traffic distribution component supports a connectionless datagram protocol. A participant key management component operates within each receiver entity where the participant key management component holds a first key that is shared with the sender and all of the receiving entities, and a second key that is shared with the sender and at least one but less than all of the receiving entities. A group key management component is coupled to the traffic distribution component and includes a data structure for storing all of the participant first and second keys.

25 Claims, 4 Drawing Sheets

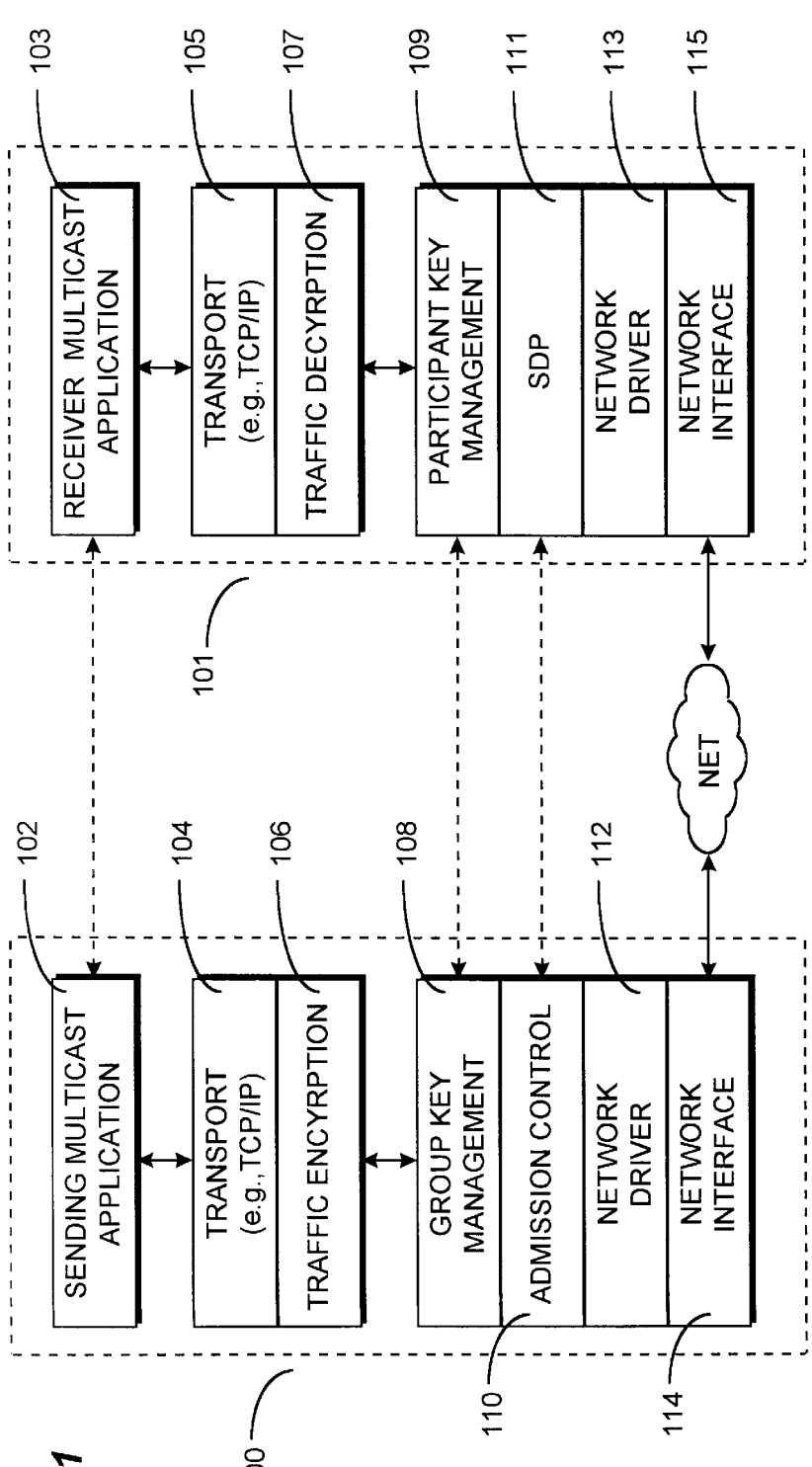

$E_{X4}(K45')$ | $E_{K45'}(K47')$ | $E_{K67}(K47')$ | $E_{K03}(TEK')$ | $E_{K47'}(TEK')$

600

EFFICIENT, SECURE MULTICASTING WITH GLOBAL KNOWLEDGE

BACKGROUND OF THE INVENTION

1. Field of the Invention.

The present invention relates, in general, to group data communications, and, more particularly, to secure multicast communications over a public network.

2. Relevant Background.

Distributed applications such as multimedia conferencing, computer-supported collaborative work, distributed computing, and remote consultation and diagnosis systems for medical applications depend on efficient information exchange among multiple participants. Multi-destination communication and data exchange over a public network is essential for such applications. Some applications, generally referred to herein as "broadcasting applications", are characterized by a small number of sending parties and a large, dynamically changing group of receiving parties. Other applications referred to herein as "conferencing applications" involve a large number of sending and receiving participants.

When a group of people want to communicate over a public network such as the Internet in a conference, every message sent out by one of the participants is received by all other participants. The mechanism used to do this communication is called multicast. Any Internet subscriber or user with access to a public network may subscribe to a multicast group and will subsequently receive all messages sent to this group. Additionally, any multicast recipient will be able to send messages to the whole group.

Multicast is rapidly becoming an important mode of communication as well as an effective platform for building group-oriented services. However, to be used for secure or trusted communication, existing multicast techniques must be supplemented by tools for protecting (i.e. encrypting and authenticating) traffic, controlling participation, and restricting access from unauthorized users.

A need for secure electronic information exchange over insecure public networks is increasingly apparent. As compared to conventional unicast, (i.e., point-to-point, multicast is more susceptible to attack. Multicast transmissions present substantially more opportunities for interception of the traffic due to the existence of multiple senders and receivers such that the message is potentially distributed over the whole network. When an attack occurs, a large number of multicast participants are affected. Further, since multicast addresses are often well known, it becomes easier for an attacker to target an attack. Moreover, multicast typically involves a large number of authorized users which can make it easier for an attacker to pose as a legitimate user and attempt attacks in parallel. While secure unicast communications are well understood, prior attempts at secure multicast communication have difficulty in scaling to large groups and handling groups with highly dynamic membership.

To help achieve secure electronic information exchange, any network security protocol should allow authorized participants to communicate securely over an insecure network under conditions where an attacker is assumed to be able to read, insert, modify, and delete raw communications. Typically, this protocol is achieved by creating a security association between the authorized participants through authentication and key exchange. The security association defines a set of keying material shared only by the authorized participants that can be used for a variety of security objectives such as authentication, confidentiality, and integrity verification.

In a multicast scenario, the security association between participants must be dynamic to support membership changes. A secure multicast must ensure that participants are only allowed to participate during periods when they are authorized. A participant may be authorized to participate in the secure multicast at some periods of time and not authorized to participate during other periods. For example, in a pay-per-view program access a receiver is only authorized for the time period for which they have paid. The security association and the group keying material it defines must be changed each time a participant joins or leaves the multicast group. This change is necessary to ensure that a joining participant is not able to access previously multicast data and the leaving entity is not able to continue to access data multicast after its authorization expires. The management and distribution of dynamic security association and keying material is a fundamental difficulty in a secure multicast protocol.

Practical communication systems must provide reasonable efficiency over the network. By efficiency it is meant that the steps taken to ensure secure communication do not add an inordinate amount of overhead traffic that consumes bandwidth without transferring "payload" information (e.g., application-level data) between participants. For the foreseeable future all communication networks will have some bandwidth limitation which places a premium on efficient communication systems. Hence, it is desirable that the security procedures require minimal communication between participants to perform key management.

To achieve efficient private communications over the network, all participants in the group need to share a secret information (i.e., key information). The manner of how this secret information is shared and maintained during the lifetime of the group is a focus of the present invention. Prior applications may continuously establish a unicast connections between a sender and all receivers to update security associations and exchange key information. Such continuously required unicast connections are not practical for large groups. For a key change many messages have to be generated or a message has to be processed by intermediate hops which is not efficient. Given a large group where participants may continuously leave and join and where the actual key has to be changed for each leave and join to achieve privacy, computing resources may be insufficient if extensive computation (e.g., such as associated with public key cryptography) is required.

An example of a key management system directed to unicast communications is the simple key management for Internet protocols (SunScreen™ SKIP, (SunScreen is a trademark of Sun Microsystems, Inc.). SKIP is a public key certificate-based key-management scheme which provides group key-management for Internet protocols. Prior multicast implementations of SKIP create a single multicast group. Designed to be application independent, SKIP can be plugged into the IP Security Protocol (IPSP) or IPV6. Using certified Diffie/Hellman keys, SKIP obviates the need for pseudo session state establishment and for prior communications between two participating ends in order to acquire and update traffic keys. One advantage of a public-key encryption that is particularly suited to connectionless datagram protocols such as the Internet protocol. In the SKIP system, each participant has the capability to construct a shared secret based only on knowledge of the other participants' public key combined with its own private key.

Multicast security protocols exhibit several types of scalability failures. A first type of failure occurs when the protocol allows the action of one member to affect the entire group. The second type of failure occurs when the protocol cannot deal with the group as a whole and instead, must consider the conflicting demands of each member on an individual basis. This requires point-to-point or unicast communication with each participant which reduces efficiency rapidly as more participants are added. A need exists for a multicast system that solves these and other scalability problems existing in the prior art.

A secure multicast framework called Iolus has been proposed that addresses some of these scalability issues by doing away with the idea of a single flat secure multicast group. Instead, Iolus substitutes the notion of a secure distribution tree. The secure distribution tree comprises a number of smaller secure multicast subgroups arranged in a hierarchy to create a single virtual secure multicast group. Because each sub-group is managed relatively independently, the Iolus framework is scalable. Each subgroup in the secure distribution tree has its own multicast group and can be created and managed using any suitable multicast routing protocol. One feature of the Iolus system is that there is no global group key or secret information that is shared among all of the subgroups. Hence, Iolus requires trust in third parties such as routers or network components. Thus, when a member joins or leaves, it affects only its local subgroup. However, because there is no global secret information shared among all of the participants, re-keying is not optimal.

SUMMARY OF THE INVENTION

Briefly stated, the present invention involves a system for secure multicast including at least one sending entity operating on a sending computer system, with a sending multicast application running on the sending computer system. A number of receiving entities each running on a receiving computer system, the receiving entities having a receiving multicast application running. A traffic distribution component is coupled to the sending entity and each of the receiving entities, where the traffic distribution component supports a connectionless datagram protocol. A participant key management component operates within each receiver entity where the participant key management component holds a first key that is shared with the sender and all of the receiving entities, and a second key that is shared with the sender and at least one but less than all of the receiving entities. A group key management component is coupled to the traffic distribution component and having a data structure for storing all of the participant first and second keys

BRIEF DESCRIPTION OF THE DRAWINGS

FIG. 1 illustrates in block diagram form an arrangement of stacked protocol layers including the secure multicast mechanism in accordance with the present invention;

FIG. 2 shows in block diagram form an exemplary data packet in accordance with the present invention;

DETAILED DESCRIPTION OF THE PREFERRED EMBODIMENTS

Figure 3:
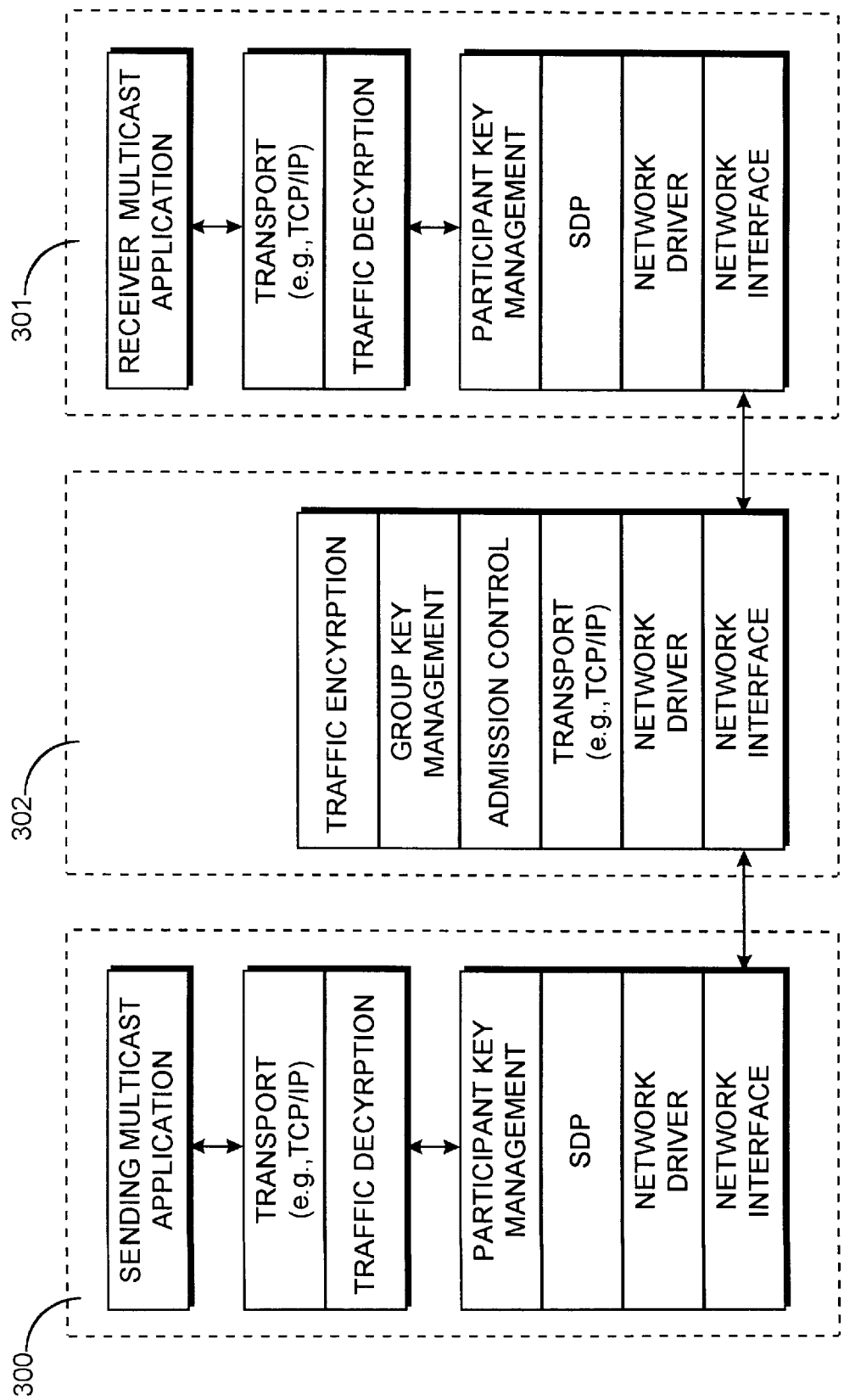
FIG. 3 shows in block diagram form an alternative secure multicast mechanism in accordance with the present invention.

The present invention is described in terms of a secure multicast system and protocol but is more generally viewed as a group communications security protocol. The system and method in accordance with the present invention provide several useful features including privacy of multicast messages, no need for trust in third parties (e.g., network components), and full exploitation of multicast features. In accordance with the present invention, key management is provided with minimal computation among the participants in a multicast. The present invention handles dynamic joins and leaves in a large virtual multicast group comprising a plurality of smaller groups defined by the keying material they share with each other. Also, the system in accordance with the present invention prevents participants from reading future or past traffic that is outside of the authorized scope.

The present invention is particularly useful in a broadcasting scenario. In this scenario the multicast group comprises a small number of sending entities and a large dynamically changing group of receiving or participant entities. Access control is performed by the senders independently or by a central access control entity. In either case key management is implemented centrally. Because key management is maintained centrally, (i.e., not distributed) the limitations of an entirely hierarchical system are largely overcome.

Given a broadcasting scenario, the secure multicast architecture in accordance with the present invention is usefully described as a plurality of interacting components that are conveniently illustrated as layers in a network protocol as shown in FIG. 1. In FIG. 1, the present invention includes an admission control component 110, a group key management component 108, a traffic encryption component 106, traffic distribution component (including network drivers 112 and 113, network interfaces 114 and 115, and a communication network), and a traffic decryption component 107. Admission control 110 is contacted by each new participant 101 in a secured group including both senders 100 and receivers 101. Optionally, the admission control component 110 also initiates forced leave of any participant. The admission control component 110 communicates with the group key management component 108 and informs it of joins and leaves.

The group key management component 108 accepts participants 101 that are admitted by the admission control component 110 and receives their keying material. For group key management component 108 and for admission control component 110 described above a secure, authenticated unicast connection is established between the group key management component 108 and the participant 101. This unicast connection only exists once for each group and participant and can be dissolved after the participant 101 receives its set up information. In this manner the relatively significant overhead created by setting up a new participant and taking down a connection to an existing participant are only performed when necessary, greatly improving the efficiency of the system in accordance with the present invention.

The traffic encryption component 106 is the component that actually sends data. The traffic encryption component 106, like all participants 101, holds a symmetric traffic encryption key (TEK) that is generated by the group key management component 108. The traffic encryption component 106 uses the TEK to encrypt data that is to be sent out. In the example of FIG. 1, the traffic encryption component receives IP packets from the transport layer 104 (which in turn include data messages generated by sending multicast application 102), encrypts the entire IP packet, and adds new header information (unencrypted) to direct the packet. This encryption can be performed using any available encryption algorithm or combination of algorithms including DES, RC4, other block stream ciphers, and the like.

The traffic distribution component is a multicast group data transport mechanism including network drivers 112 and 113, and network interfaces 114 and 115. The traffic distribution component is located in both the sending and receiving entities 100 and 101. The traffic distribution component also includes a physical and/or virtual network coupling the sender with the receivers. An example traffic distribution network includes a multicast backbone (MBONE) virtual transport mechanism operating on top of a conventional Internet protocol (IP) Internetwork. On the receiver side, traffic distribution component comprises a network interface 115 and network driver 113 for sending and receiving IP datagrams. Encrypted IP datagrams are passed upward and normally decrypted by the traffic decryption component 107. The traffic decryption component 107 is the receiver of data and inverts the operation of the traffic encryption component 106 in the sending unit 100. Decrypted or plain-text packets are handed upward to the receiving multicast application 103 through transport layer 105.

Session directory layer (labeled SDP in FIG. 1) 111 serves to intercept session description protocol (SDP) packets and translate them to handle participants 101 joining and leaving a multicast session. The SDP layer 111 essentially communicates with the admission control layer 110 using conventional mechanisms in combination with the message format in accordance with the present invention described hereinbelow. Participant key management component 109 receives information from the group key management component 108 and takes actions, described hereinafter, to obtain and maintain participant key records.

Optionally, group key management 108, admission control 110 and traffic encryption 106 may all be united in a single entity as shown in FIG. 1 thereby establishing a sender 100. Alternatively, these components may be embodied in different entities as shown in FIG. 3. When they are embodied in a single entity (as shown in FIG. 1), the sender 100 and receiver 101 handling differ from each other as shown in FIG. 1. In the embodiment shown in FIG. 3, a central access control entity 302 is used to handle group key management and admission control and encryption, the sender 300 and receiver 301 comprise symmetrical components and differ primarily in purpose but not functionality. In comparing the implementation shown in FIG. 1 with the implementation shown in FIG. 3, layers bearing similar designation include substantially similar functionality and construction to that described in reference to FIG. 1.

The present invention is usefully understood in terms of five distinct stages or states in the operation of the components described herein before. The states include "group creation", "group join", "data transfer", "group leave" and "group destruction". These operational states are described in greater detail after describing the data structures of the major components in accordance with the present invention.

The group key manager 108 is aware of all currently active recipients as identified from the session description information (i.e., IP address, keying material, and some identification) from the recipients. By "aware of" and "knows" as used herein it is meant that the software implementing the group key manager 108 includes variable declarations to construct variables that hold the specified information. The group key manager 108 is also aware of the currently active traffic encryption key. The group key manager 108 knows a number N shared secrets (i.e., keys) of which it shares one with each of a number N participants 101. N/2 shared secrets are known each of which are shared with sets comprising two the participants 101, N/4 shared secret are known each of which are shared with sets comprising four of the participants 101, etc. Two shared secrets are known each of which are shared with either a first half of the participants 101 or a second (complementary) half of the participants 101. The traffic encryption key is a secret shared among all of the participants 101 with the group key manager 108. Hence, the manager holds (2*N)−1 shared secrets, of which one is the actual traffic encryption key, the others are key encryption keys.

Figures 4, 6:
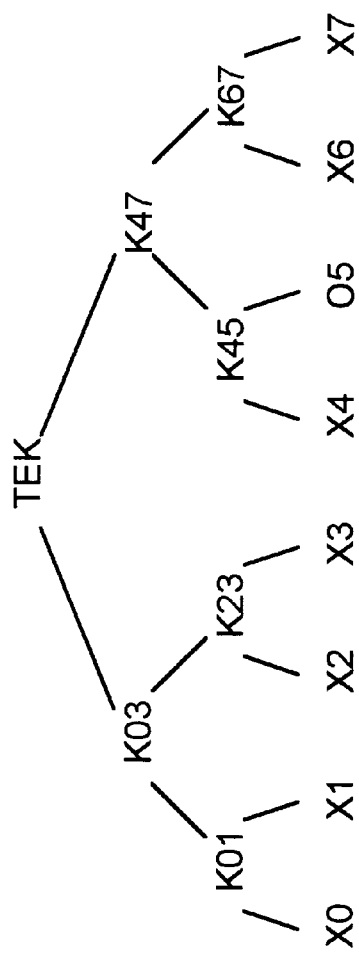
FIG. 4 shows a hierarchical key tree illustrating the operation of the system in accordance with the present invention.
FIG. 6 illustrates an exemplary data packed used for communicating rekey information in accordance with the present invention.

The participants 101 are identified with an identification or ID number which may be a number assigned by the group key manager 108 when admission control is completed. Alternatively, the ID may simply correspond to the 32 bit IP address of the participant 101 in which case synchronization and numbering issues become unimportant. It is contemplated that other ID assignment mechanisms may be used and be more appropriate in certain applications. The bit pattern of the ID of each participant 101 defines which keys it shares with the group key manager. This may be represented, as shown in FIG. 4, as a binary tree, with the secret shared among all participants 101 and group key manager 108 above the root being the traffic encryption key and the other shared secrets among selected recipients 101 forming the leaves. Further up every node is populated by shared secrets known to more and more participants. Each participant holds $\log_2$ (N) key encryption keys (KEKs) and one traffic encryption key (TEK). Associated with each key is a version number and a revision number, used in the actual communication to notify the participants of key updates.

In this manner, the hierarchical structure and grouping of participants is actually implemented by the security associations between the participants 101 and the group key manager 108 rather than by addition of intermediate subgroup management entities as in prior systems. In a sense, the hierarchical grouping of participants 101 is a virtual grouping brought about by the security associations. The system and method in accordance with the present invention provides the advantages of a hierarchically distributed system without the implementation limitations of existing secure distribution tree implementations.

During join operations, revision numbers of the keys in the path of the new participant are increased, and these keys are put through a one-way function implemented by group key management component 108 and participant key management components 109. The one-way function, which is identical among the group key manager 108 and each participant 101, causes new keying material to be generated, without the need for communicating the new keying material from the group manager 108 to the participants 101. All that needs to be communicated is the increased revision number. The transmission of the revision number of the KEKs can be postponed until the updated keys are actually used. This occurs during a leave operation (described below). An example one-way function is an MD5 algorithm or an equivalent.

During leave operations, every key in the path to the leaving participant is changed, including the TEK itself, the changed keys need to be communicated from the group manager 108 to each of the participants 101 that share one of the changed keys. Also, the version numbers of those keys are increased. Perfect forward privacy may be achieved by periodical change of keying material and change of revision numbers.

Group creation is accomplished when the group key manager 108 allocates a key management multicast group, and announces its public key parameters and access control contact address. This announcement is made in a heartbeat message which is a message that is sent to the group periodically. The participant SDP component 111 receives the heartbeat message and uses this information to request and establish a coupling with the group key management component. Alternatively, a conventional multicast session directory service such as an MBONE session directory or and X.500 directory service can be substituted for this function of the heartbeat message. The heartbeat message also includes the version number and revision number (shown in FIG. 2) fields which enables a participant 101 that has missed a missed a revision to resynchronize with the multicast by determining the revised TEK.

Join operations are provided when the participant key manager 109 receives the address of the multicast group via the session directory component 111 and receives a heartbeat message from the group key manager 108. The participant key manager 109 establishes a private and authenticated connection with the admission control component 110 to receive access. If successful, the participant key manager 109 receives a unique ID or may use its IP address as its ID. The participant key manager 109 also receives key encryption keys and the traffic encryption key that are assigned by group key management component 108. The participant key manager 109 can begin to process traffic from the sender(s) 100 using the received keys. Once the connection is set up, the unicast connection with the admission control component 110 and group key management component 108 is closed. The received traffic encryption key is passed on to the traffic encryption/decryption component 107.

In operation, the group key manager 108 operates to increase the revision of all keys that it is about to send to any new participants 101. The group key manager 108 puts the keys through the one-way function. The resulting new key is stored in a database within the group key manager 108. The revision change of the traffic encryption key is transferred to the senders 100. The group key manager 108 sends the new keys to the new participant 101 and the unicast connection to the new participant 101 is closed. Senders 101 may be notified via dedicated unicast links or by multicast messages. To discourage active attacks, a dedicated unicast link which is secured and periodically tested for liveliness is recommended. This is not an issue if the group access functionality and the sender are the same entity as shown in the configuration of FIG. 1.

Traffic encryption is accomplished in the sender 100 by the traffic encryption component 106. The sender 100 is notified of the revision change and puts the revised key through the one-way function to generate the new key and starts encrypting data with the new key. Old participants 101 detect the increase of the revision number and put their stored traffic encryption key through the one-way function. This generates the new TEK' in the old participant's database which is transferred to the traffic decryption component 107 in the participant 101. Once the new key update occurs, normal operation continues. In this manner, the sender 100 need only communicate that a key has been revised in order for all participants 101 to update their keys to the new key.

Normal data transfer in accordance with the present invention is sent in packets 200 having a format shown in FIG. 2. Each packet includes an association ID field which gives the ID of the group key manager 108 or sender 100 originating the data packet 200. Each packet 200 also includes a key version field and a key revision field. The key encryption key revision number may be a single bit which is set (i.e., placed in a one level) by join operations and reset after a leave operation has caused this key to be replaced. Additional headers which may comprise one or more header fields used in the traffic distribution component are also provided. The encrypted payload typically comprises an encrypted IP packet (e.g., a SKIP packet). As each packet is received by a receiving participant 101, the participants 101 can detect key revision changes and use the one-way function to generate a revised key. Each packet may also indicate version changes which involve new keys, but the new key is provided in a separate update message described hereinbelow. The participant 101 can also request version updates if it appears they have missed messages due to damaged or dropped packets which are typical in an Internet application.

During a leave operation the access control component 110 informs the group key management 108 that one or more participants 101 are leaving the group so that they are no longer authorized to receive group multicast messages. The access control component 110 may initiate or throw out these participants 101 or simply may have detected that the participants themselves have left. In response, the group key manager component 108 identifies all keys known by the participant(s) 101 that are to be thrown out. All of these keys need to be replaced by new versions. Only the keys that are shared with or known to the participants that are to be thrown out are discarded.

A sufficiently random source of keying material is used to generate the new keys. Any available and sufficiently random key generator apparatus (e.g., a DES component) may be used. Preferably, the new key encryption keys are in no way dependent on the old key encryption keys (e.g., hashing a concatenation of old key encryption keys does not provide sufficient security as an enemy impersonating as multiple entities can recover new key encryption keys which it is not supposed to know). One can use a secret known only to the group key manager and hash it with a time stamp and counter, version number or node position. The new keys are transmitted to all of the participants 101. The message used to send the new keys is generated in manner understood with reference to the binary key sharing structure shown in FIG. 4. First, the closest neighbor of the leaving participants are identified, and the new next upper level key encryption key is encrypted with the key encryption key that it shares only with the group manager. Next, the key assigned to the second lowest node level is encrypted with the keys of its two descendants or children. One of these two descendants has just been newly established. This process is repeated all the way up to the root of the tree which holds the actual traffic encryption key.

Figure 5:
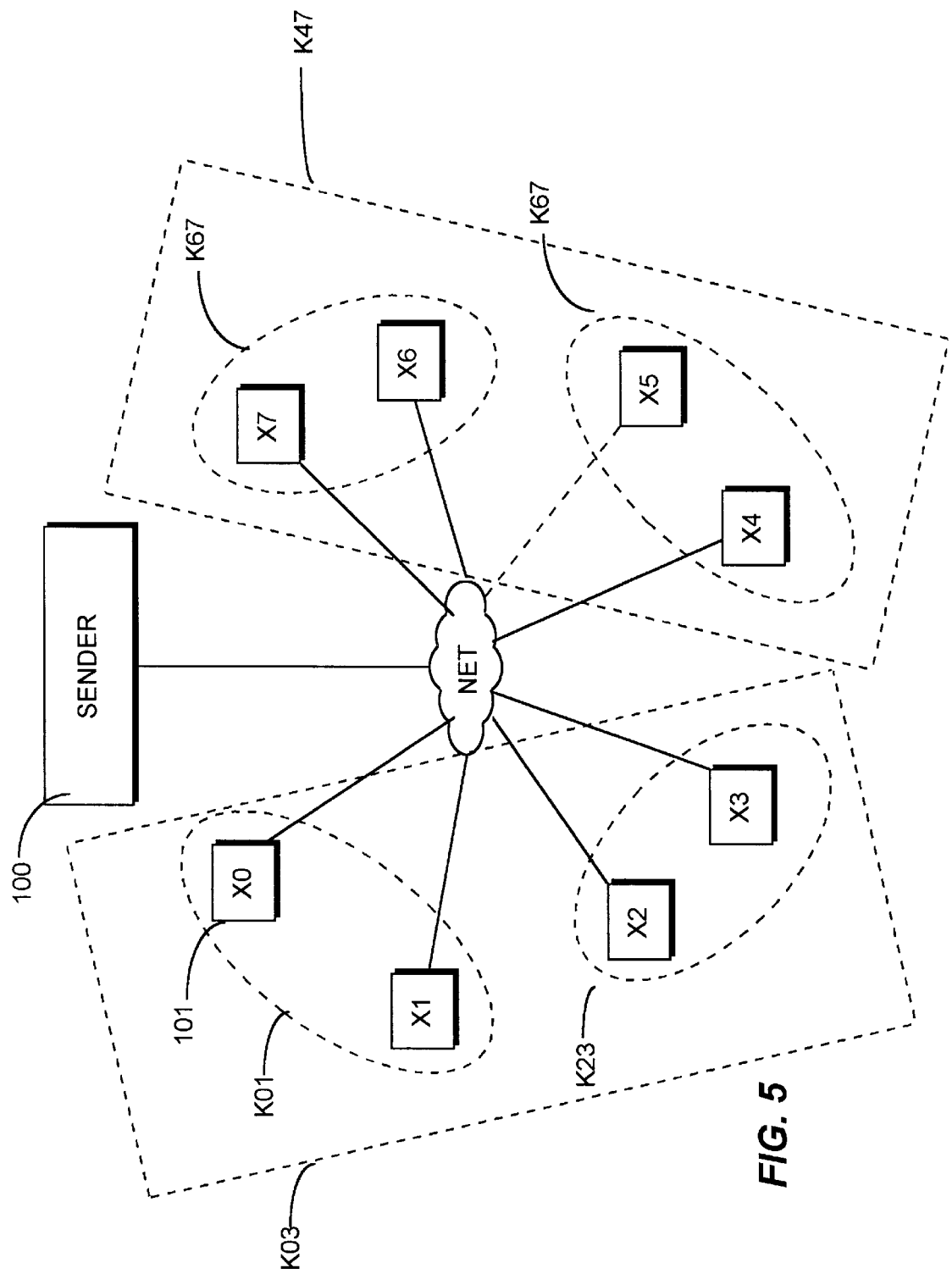
FIG. 5 shows in block diagram form a grouping feature in accordance with the present invention.

An example of this process is illustrated in FIG. 4 and graphically illustrated in FIG. 5 using a group of eight participants. In FIG. 4, X0, X1, X2, X3, X4, X6, and X7 represent participants which are remaining in the multicast group. 05 represents a participant that is being thrown out or leaving the multicast group. Each participant 101 holds one key encryption key, one KEK that is shared with one other participant 101 to form groups identified by dashed line ovals in FIG. 5. Each dashed line oval in FIG. 5 is labeled to indicate what key is shared. For example, K01 indicates the key shared only by participant X0 and participant X1. Similarly, the K23, K45, and K56 groups are indicated.

A KEK labeled K03 is shared among four participants as indicated by the dashed line rectangle in FIG. 5. Another KEK labeled K47 is shared among the indicated participants. Finally, the TEK is shared among all participants 101. Participant 05 is shown in FIG. 5 as coupled by a dashed line as this participant is leaving (or being thrown out of) the multicast group. In this case, all keys held by participant 05 must be changed (i.e., K45, K47, and TEK need to be changed such that 05 cannot get the new keys).

A message 600 sent by the group key manager 108 to achieve this is shown in FIG. 6. In FIG. 6, the message comprises five fields, each including the result of one encryption calculation. In FIG. 6, the first field is the result of the closest neighbor of the removed participant (i.e., K45') which is encrypted with the KEK that it shares only with the group manager (i.e., X4). Similarly, the second field includes the result of an encryption of the next hierarchically superior KEK (i.e., K47') encrypted with the key of the next two descendants (i.e., K67). The final two entries include the next hierarchically superior key (in this case TEK') encrypted with its two descendant keys K03 and K47'. In the particular example, the prime designation represents that a new revision of the key is calculated using the one-way function described hereinbefore.

The number of encryptions for an arbitrary number N of participants is 2*log$_2$(n)-1. Preferably all encrypted keys together with version information fit into one single multicast message such as the format shown in FIG. 2. Although a multicast message is used to send the updated KEK information, it should be noted that only the selected participants 101 that require the new KEK information actually have the ability to decrypt the multicast message to retrieve the updated keys. In the example above, only participant X4 can decrypt the K45' key. In this manner, key update is performed securely without need for additional unicast or point-to-point sessions to be established.

The participant key management component 109 shown in FIG. 1 receives the key encryption update message and updates its stored keys by putting the keys it shares with the message through the one-way function until revision numbers match. Participant key management component 109 decrypts as much as possible to access the changed KEK's and the new TEK. The new TEK (i.e., TEK') and its version is then passed to the traffic encryption/decryption component 107. The participant traffic encryption/decryption component 107, which in a broadcast scenario could be implemented with just a decryption mechanism receives the new TEK' and revision information and adds it to its store of known keys.

Because there may be old messages on the network which get delivered out of order, for example after a key change occurred, old keys are saved for some period of time in participant key manager 109 to decrypt these older messages. The older keys are thrown away after a preselected amount of time (e.g., 60 seconds) or alternatively by using a frequency of use or time since last used criteria. Eliminating old keys achieves forward secrecy and hinders replay type attacks or security attacks.

To terminate the secure multicast session, the computer implemented components making up participants 101 and group key manager 108 are destructed. When the group key manager and the participants 101 cease to exist, all secrets are discarded. Individual shared secrets may be stored for further use, to expedite future join operations.

In accordance with the present invention, multiple joins or leaves may be processed simultaneously. Resulting messages can be collated or merged into a single key update message to save computing power and bandwidth. If a participant 101 is disconnected for a while and then comes back, that participant can catch up for revision changes without communicating with any other entity by repeatedly applying the one-way function to generate the current keys. If a participant missed some version changes, he must ask any member of the group or the group manager to provide him with a log of key version change messages. Alternatively, he may reestablish a connection with the group key manager 108 through admission control component 110 and perform a new join operation.

A data structure for storage of the security associations in the group key manager 108 can be implemented using a binary tree. This binary tree may be allocated to a fixed size or it may be expanded at run time depending on the number of active participants and the expected level of dynamic joins and leaves. Alternatively, it can be implemented as a compressed particia-type tree where nodes may range into differing depths. This compressed particia-type tree optimizes storage space for sparse leaf population. Growing a tree is performed by dynamically assigning shared keys of higher levels (new root-branches). The newly assigned key is then communicated to the old subgroup as it would have done normally for a leave operation (described hereinbefore). This information is also communicated to all newcomers in the group.

One way to map the participant ID on the binary or particia tree is to begin at the root of the tree. Examining the most significant bit of the participant ID, if the bit is zero take a left branch, otherwise take a right branch. The newly reached node is made the new root and its associated key encryption key is remembered and the most significant bit of the ID is stripped. This process is repeated iteratively until the participant ID is void and a leaf of the tree is reached.

In accordance with the present invention, a system for secure multicast communication is provided which requires storage space in the group key manager that increases linearly with the number of participants. Moreover, storage space required by each participant increases as the log of the number of participants. Hence, the solution in accordance with the present invention is highly scalable because it does not create burdensome storage requirements as the number of participants grows. Similarly, the number of computations required to update keys on a join or leave is small to conserve band width. Joining does not require an extra message to be sent to the group as this information is implied in the traffic encryption key revision number transmitted with each multicast packet. Leaves require a single message having a size that is proportional to the log of the number of participants. This solution preserves band width and minimizes computation complexity in both the sender and receiving entities.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, in some applications denial of service by other participants may be an issue. In these cases, it is desirable to authenticate communications originating from the group key manager by either symmetrical or asymmetrical authentication techniques. These and similar modifications are readily implemented in accordance with the basic teachings of the present invention and are considered equivalents.

We claim:

1. A system for secure multicast comprising:
   at least one sending entity operating on a sending computer system, the sending entity having a sending multicast application running thereon;
   a number (N) of receiving entities each of which run on a receiving computer system, the receiving entities having a receiving multicast application running thereon;
   a traffic distribution component coupled to the sending entity and each of the receiving entities, the traffic distribution component supporting a connectionless datagram protocol;
   a participant key management component within each receiver entity, the participant key management component holding a first key that is shared with the sending entity and all of the number (N) of receiving entities, and a second key that is shared with the sending entity and at least one but less than all of the receiving entities; and
   a group key management component coupled to the traffic distribution component and having a data structure for storing all of the participant first and second keys.

2. The system of claim 1 wherein the second keys are associated with an ID identifying which of the participant key management components that share that second key.

3. The system of claim 1 further comprising:
   a random key generator in the group key management component, wherein the group key management component assigns the first and second keys to each of the participant key management components using the random key generator.

4. The system of claim 1 wherein the group key management component is located in the sending entity.

5. The system of claim 1 further comprising:
   a central access entity running on a central access computer system and coupled to the traffic distribution component, wherein the group key management component is located in the central access entity.

6. The system of claim 1 further comprising:
   a traffic encryption component coupled to the group key management component and to the sending entity to encrypt datagrams from the sending entity using the first key stored in the group management component; and
   a traffic decryption component within each receiving entity coupled to the participant key management component to decrypt datagrams received from the traffic distribution component using the first key stored in the participant key management component.

7. The system of claim 6 wherein the traffic encryption component and the traffic decryption components use a Diffie/Hellman key exchange protocol.

8. The system of claim 1 wherein the data structure comprises a binary tree.

9. A system for secure multicast comprising:
   at least one sending entity operating on a sending computer system, the sending entity having a sending multicast application running thereon;
   a number (N) of receiving entities each of which run on a receiving computer system, the receiving entities having a receiving multicast application running thereon;
   a traffic distribution component coupled to the sending entity and each of the receiving entities, the traffic distribution component supporting a connectionless datagram protocol;
   a participant key management component within each receiver entity, the participant key management component holding a first key that is shared with the sending entity and all of the number (N) of receiving entities, and a second key that is shared with the sending entity and at least one but less than all of the receiving entities, wherein the first key is marked with a version tag;
   a group key management component coupled to the traffic distribution component and having a data structure for storing all of the participant first and second keys; and
   a plurality of one-way function generators operating in the group key management component and each of the participant key management components, wherein each of the one-way function generators accept the first key as input and implement the same one-way function on the first key to generate a new version of the first key.

10. The system of claim 9 wherein the group key manager generates a revised first key and signals the revision change to the participant key management components.

11. A system for secure multicast comprising:
    at least one sending entity operating on a sending computer system, the sending entity having a sending multicast application running thereon;
    a number (N) of receiving entities each of which run on a receiving computer system, the receiving entities having a receiving multicast application running thereon;
    a traffic distribution component coupled to the sending entity and each of the receiving entities, the traffic distribution component supporting a connectionless datagram protocol;
    a participant key management component within each receiver entity, the participant key management component holding a first key that is shared with the sending entity and all of the number (N) of receiving entities, and a second key that is shared with the sending entity and at least one but less than all of the receiving entities;
    a group key management component coupled to the traffic distribution component and having a data structure for storing all of the participant first and second keys;
    a heartbeat message generator within the group key management component periodically announcing public key parameters and an access control contact address; and
    an admission control component coupled to the traffic distribution component and responsive to receive responses to the heartbeat message and selectively admit receiving entities and send a message to the group key management component with an ID for the admitted receiving entity.

12. A system for secure multicast comprising:
    at least one sending entity operating on a sending computer system, the sending entity having a sending multicast application running thereon;
    a number (N) of receiving entities each of which run on a receiving computer system, the receiving entities having a receiving multicast application running thereon;
    a traffic distribution component coupled to the sending entity and each of the receiving entities, the traffic distribution component supporting a connectionless datagram protocol;

a participant key management component within each receiver entity, the participant key management component holding a first key that is shared with the sending entity and all of the number (N) of receiving entities, and a second key that is shared with the sending entity and at least one but less than all of the receiving entities;

a group key management component coupled to the traffic distribution component and having a data structure for storing all of the participant first and second keys wherein the data structure comprises a compressed particia-type tree.

13. A secure multicast system receiver running on a receiver computer system that is coupled to a multicast enabled traffic distribution network, the secure multicast system receiver comprising:

a traffic distribution component coupled to interface with the network;

a session directory component coupled to intercept session description protocol (SDP) from the traffic distribution component and respond to the intercepted SDP packets by establishing a multicast session with an external multicast sender;

a participant key management component having storage holding a first key that is shared with all of a plurality of external participants, the external participants including at least one multicast sender and at least one external group access control manager, a second key that is shared with the group access control manager and at least one but less than all of the external participants, and a third key that is shared with the group access control manager and none of the other external participants;

a traffic encryption/decryption component coupled to receive encrypted data packets from the traffic distribution component and decrypt the received data packets using the first and second key; and a transport component coupled to the traffic encryption/decryption component to receive the decrypted data packets and generate application data; and a receiver multicast application coupled to the transport component to receive the application data and provide receiver-side multicast services using the received application data.

14. The secure multicast system receiver of claim 13, wherein the group key manager transmits a key update message on the traffic distribution network, the key update message comprising a new version of the second key encrypted using only the second key and/or the third key, and the secure multicast system receiver further comprises:

a key update component within the participant key management component and responsive to the key update message to determine if its second key is included in the key update message and decrypt the encrypted new second key using the third key, the key update component saving the decrypted new second key to the participant key management storage.

15. The secure multicast system receiver of claim 13 further comprising:

a one-way function generator operating in the participant key management component, wherein the one-way function generator accepts the first key as input and implement the one-way function on the first key to generate a new revision of the first key.

16. The secure multicast system receiver of claim 15 wherein the external group key manager signals the revision change to the participant key management components.

17. A sender secure multicast system running on a sender computer system coupled to a virtual multicast group through a multicast enabled traffic distribution network, the sender secure multicast system comprising:

a traffic distribution component coupled to interface with the network;

a group key management component coupled to the traffic distribution component and having a data structure for storing an ID for each participant in the virtual multicast group;

a transmission encryption key (TEK) stored in the group key management component, wherein the TEK is shared with all participants in the virtual multicast group;

a plurality of first key encryption keys (KEKs) stored in the group key management component such that one KEK is associated with each stored ID, wherein each first key is shared with only the participant associated with the ID;

a plurality of second KEKs stored in the group management component, wherein each second KEK is shared with a set of participants comprising more than one, but less than all of the participants;

a traffic encryption component receiving unencrypted data packets and generating encrypted data packets using the TEK; and a transport component receiving application data and generating the unencrypted data packets to the traffic encryption component; and a sending multicast application generating application data coupled to the transport component.

18. The sender secure multicast system of claim 17 further comprising:

a key revision component within the group key manager operable to revise the TEK and the KEKs, the key revision component comprising:

a one-way function generator operating in the group key management component, wherein the one-way function generator accepts the TEK as input and implement the one-way function to generate a new revision TEK; and a revision signaling component to indicate in the encrypted data packets that the revised TEK is used to encrypt the data packet.

19. The sender secure multicast system of claim 18 wherein the revised TEK is not included in the encrypted data packet.

20. The sender secure multicast system of claim 17 further comprising:

a KEK update component responsive to a participant leaving the virtual multicast group, the KEK update component operating in the group key manager, the KEK update component further comprising:

a random key generator operating in the group key management component, wherein the random key generator generates a new second KEK for every set of participants that included the leaving participant, wherein the traffic encryption component encrypts the new second KEKs using selected ones of the first and second KEK's that are not known to the leaving participant; and as update signaling component within the group key management component generating a data packet including the encrypted new second KEK's.

21. The sender secure multicast system of claim 17 wherein the group key management component has public key parameters and an access control contact address, the system further comprising a heartbeat message generator within the group key management component periodically announcing its public key parameters and access control contact address.

22. The sender secure multicast system of claim 21 further comprising an admission control component coupled to the traffic distribution component and responsive to receive responses to the heartbeat message and selectively admit receiving entities to the virtual multicast group and send a message to the group key management component with an ID for the admitted receiving entity.

23. A method for conducting secure multicast communication over an insecure connectionless communication network with a virtual multicast group, the method comprising the computer implemented steps of:

creating a sending entity having public key parameters and an access control contact address;

generating a heartbeat message periodically announcing the public key parameters and access control contact address;

receiving the heartbeat message at a participant entity;

generating a request to be admitted within the participant entity;

transmitting the request to be admitted to the access control contact address identified in the heartbeat message;

in response to the participant meeting preselected externally supplied criteria, providing the participant entity an ID identifying the participant entity and sending the participant a transmission encryption key (TEK), wherein the TEK is shared with all participants in the virtual multicast group;

in response to the participant meeting the preselected externally supplied criteria, providing the participant a first key encryption keys (KEK), wherein the first key is shared with only the participant;

in response to the participant meeting the preselected externally supplied criteria, providing the participant a plurality of second KEKs, wherein each second KEK is shared with a set of participants comprising more than one, but less than all of the participants in the virtual multicast group;

encrypting multicast data packets using the TEK; and transmitting the encrypted multicast data packets over the communications network.

24. The method of claim 23 further comprising:

revising the TEK and KEYs by passing the TEK and KEKs individually through a one way function in the sending entity, encrypting the multicast data packets using the revised TEK and KEKS, and signaling in the encrypted data packet that the revised TEK was used to encrypt the packet.

25. The method of claim 24 further comprising the steps of:

updating the second KEKs in response to a participant leaving the virtual multicast group by:

randomly generating a new second KEK for every set of participants that included the leaving participant, encrypting the new second KEKs using selected ones of the first and second KEK's that are not known to the leaving participant; and generating a data packet including the encrypted new second KEK's.

* * * * *